US009834197B2

(12) United States Patent
Hirano et al.

(10) Patent No.: US 9,834,197 B2
(45) Date of Patent: Dec. 5, 2017

(54) SECTION ACQUISITION SYSTEM, SECTION ACQUISITION METHOD, AND SECTION ACQUISITION PROGRAM

(71) Applicants: AISIN AW CO., LTD., Anjo-shi, Aichi-ken (JP); TOYOTA JIDOSHA KABUSHIKI KAISHA, Toyota-shi, Aichi-ken (JP)

(72) Inventors: Satoshi Hirano, Anjo (JP); Takayuki Miyajima, Anjo (JP); Tomoki Kodan, Toyota (JP); Kuniaki Tanaka, Toyota (JP)

(73) Assignees: AISIN AW CO., LTD., Anjo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/021,538

(22) PCT Filed: Jun. 18, 2014

(86) PCT No.: PCT/JP2014/066118
§ 371 (c)(1),
(2) Date: Mar. 11, 2016

(87) PCT Pub. No.: WO2015/045514
PCT Pub. Date: Apr. 2, 2015

(65) Prior Publication Data
US 2016/0229389 A1    Aug. 11, 2016

(30) Foreign Application Priority Data
Sep. 30, 2013   (JP) ................................ 2013-204700

(51) Int. Cl.
*B60W 20/12*   (2016.01)
*G01C 21/34*   (2006.01)
(Continued)

(52) U.S. Cl.
CPC .......... *B60W 20/12* (2016.01); *B60L 11/1862* (2013.01); *B60W 10/06* (2013.01);
(Continued)

(58) Field of Classification Search
CPC ............. B60W 20/12; B60W 40/1005; B60W 2530/16; B60W 2550/402; G01C 21/3469; G01C 21/3492
See application file for complete search history.

(56) References Cited

U.S. PATENT DOCUMENTS 6,032,461 A * 3/2000 Kinugasa ................ F01N 3/023
60/285
6,314,347 B1 * 11/2001 Kuroda ................ B60W 20/12
701/22

(Continued)

FOREIGN PATENT DOCUMENTS

DE    102010039653 A1 *  2/2012
JP         08044997 A  *  2/1996
(Continued)

OTHER PUBLICATIONS

JPO machine translation of JP 2008-201165 (original JP document published Sep. 4, 2008).*
(Continued)

*Primary Examiner* — Behrang Badii
*Assistant Examiner* — David Testardi
(74) *Attorney, Agent, or Firm* — Oliff PLC (57) ABSTRACT

Section acquisition systems, methods, and programs acquire a scheduled travel route of a vehicle driven by at least one of an internal combustion engine or a motor. The systems, methods, and programs divide the scheduled travel route that is in a range of a predetermined distance from a current location into a plurality of sections such that a difference in traffic congestion degree is distinguished, and divide the (Continued)

scheduled travel route that is not in the range of the predetermined distance from the current location into a plurality of sections such that a difference in travel load is distinguished.

6 Claims, 4 Drawing Sheets

(51) Int. Cl.
| | | |
|---|---|---|
| *B60W 40/10* | (2012.01) | |
| *B60L 11/18* | (2006.01) | |
| *B60W 20/13* | (2016.01) | |
| *B60W 10/06* | (2006.01) | |
| *B60W 10/08* | (2006.01) | |
| *B60W 30/182* | (2012.01) | |
| *B60W 10/26* | (2006.01) | |

(52) U.S. Cl.
CPC ............ *B60W 10/08* (2013.01); *B60W 10/26* (2013.01); *B60W 20/13* (2016.01); *B60W 30/182* (2013.01); *B60W 40/1005* (2013.01); *G01C 21/3469* (2013.01); *G01C 21/3492* (2013.01); *B60W 2510/244* (2013.01); *B60W 2550/14* (2013.01); *B60W 2550/20* (2013.01); *B60W 2550/402* (2013.01); *B60W 2710/06* (2013.01); *B60W 2710/08* (2013.01); *B60Y 2200/92* (2013.01); *Y02T 10/6286* (2013.01); *Y02T 10/7258* (2013.01)

(56) References Cited

U.S. PATENT DOCUMENTS

| | | | | |
|---|---|---|---|---|
| 7,013,205 B1* | 3/2006 | Hafner | .................. | B60L 11/126 180/165 |
| 2002/0107618 A1* | 8/2002 | Deguchi | ............... | B60W 20/12 701/22 |
| 2004/0225437 A1* | 11/2004 | Endo | ....................... | G01C 21/34 701/415 |
| 2004/0230376 A1* | 11/2004 | Ichikawa | ............... | G01C 21/26 702/2 |
| 2009/0265091 A1* | 10/2009 | Machii | ................... | G01C 21/28 701/532 |
| 2010/0010697 A1* | 1/2010 | Soma | ..................... | B60K 6/445 701/22 |
| 2010/0131139 A1* | 5/2010 | Sakai | ....................... | B60K 6/46 701/22 |
| 2010/0185384 A1* | 7/2010 | Naito | ..................... | G01C 21/26 701/532 |
| 2010/0305799 A1* | 12/2010 | Yamada | ................... | B60K 6/46 701/22 |
| 2011/0246004 A1* | 10/2011 | Mineta | .................. | B60W 20/12 701/22 |
| 2011/0246019 A1* | 10/2011 | Mineta | .................. | B60W 20/00 701/31.4 |
| 2012/0010767 A1* | 1/2012 | Phillips | .............. | G01C 21/3469 701/22 |
| 2012/0053771 A1* | 3/2012 | Yoshida | .............. | B60L 11/1842 701/22 |
| 2012/0109510 A1* | 5/2012 | Ota | ...................... | B60W 30/188 701/400 |
| 2013/0035823 A1* | 2/2013 | Yoshida | .................... | B60T 1/10 701/31.5 |
| 2015/0066270 A1* | 3/2015 | Ogawa | .................. | B60W 20/00 701/22 |
| 2015/0066271 A1* | 3/2015 | Ogawa | ..................... | B60L 7/14 701/22 |

FOREIGN PATENT DOCUMENTS

| | | | | |
|---|---|---|---|---|
| JP | 2000-287302 A | | 10/2000 | |
| JP | 2003-009310 A | | 1/2003 | |
| JP | 2003009310 A | * | 1/2003 | |
| JP | 2006-267006 A | | 10/2006 | |
| JP | 2008-082944 A | | 4/2008 | |
| JP | 2008-201165 A | | 9/2008 | |
| JP | 2008201165 A | * | 9/2008 | |
| WO | 2012/069533 A1 | | 5/2012 | |
| WO | 2013/110709 A1 | | 8/2013 | |
| WO | 2013/132640 A1 | | 9/2013 | |
| WO | WO 2013/132593 A1 | * | 9/2013 | |
| WO | WO 2013/132640 A1 | * | 9/2013 | |

OTHER PUBLICATIONS

Translation of PCT/JP2012/056035 (international application dated Mar. 8, 2012, published as WO 2013/132640; from FW of 14/383352).*

* cited by examiner

SECTION ACQUISITION SYSTEM, SECTION ACQUISITION METHOD, AND SECTION ACQUISITION PROGRAM

TECHNICAL FIELD

Related technical fields include section acquisition systems, methods, and programs for dividing a scheduled travel route into a plurality of sections in order to control a vehicle according to a travel load in each section.

BACKGROUND

There have been known techniques for performing various types of control in vehicles, and analyses are made for such control for each travel section. Japanese Patent Application Publication No. 2000-287302 (JP 2000-287302 A), for example, discloses that road environment information is analyzed for each of travel sections obtained by dividing a route at intersections.

SUMMARY

There has not been any system that provides sections generally usable in a vehicle driven at least one of an internal combustion engine or a motor. In general, in a hybrid vehicle driven by at least one of an internal combustion engine or a motor, control for suppressing fuel consumption is performed, for example, by switching between a mode in which the vehicle is driven by using both the internal combustion engine and the motor and a mode in which the vehicle is driven by using the motor without using the internal combustion engine. In the control for suppressing fuel consumption, processing of estimating fuel consumption, etc. is performed for each section, but travel sections obtained by dividing a route at intersections as in the related art are not always classified appropriately. Specifically, examples of elements to be concerned for suppressing fuel consumption include a road gradient, traffic congestion on a road, and a travel load for traveling on the road. However, dividing a route at intersections does not mean dividing a route for each element to be concerned. Thus, in the case of dividing a scheduled travel route at intersections, the same element might be present in adjacent sections in some cases. In such cases, analyses on the sections show the same result, and an unnecessary processing load increases as compared to a case where these sections are defined as one section. In addition, in the case where a route is divided at intersections and control is performed for a long distance (e.g., 200 km), the number of sections is so large that resources (e.g., a communication band, a CPU, and a memory) are wastefully consumed.

Furthermore, hybrid vehicles can include various types of vehicles such as plug-in hybrid vehicles capable of being charged with power plugs and general hybrid vehicles incapable of being charged with power plugs. Such different types of hybrid vehicles employ different modes in some cases, and some modes are employed by only one of these types of hybrid vehicles in other cases, for example. Thus, a dedicated rule for defining sections can be made for each of different types of hybrid vehicles. However, if a device (e.g., a navigation system) dedicated to each of different types of hybrid vehicles is to be configured, fabrication processes of this device will be complicated, resulting in an increased cost.

Exemplary embodiments of the broad inventive principles described herein define sections that are usable for different types of hybrid vehicles.

Exemplary embodiments provide a section acquisition system that includes: scheduled travel route acquisition means for acquiring a scheduled travel route of a vehicle driven by at least one of an internal combustion engine or a motor; and section acquisition means for dividing a scheduled travel route that is in a range of a predetermined distance from a current location into a plurality of sections such that a difference in traffic congestion degree is distinguished, and dividing a scheduled travel route that is not in the range of the predetermined distance from the current location into a plurality of sections such that a difference in travel load is distinguished.

Exemplary embodiments provide a section acquisition method that includes: a scheduled travel route acquisition step of acquiring a scheduled travel route of a vehicle driven by at least one of an internal combustion engine or a motor; and a section acquisition step of dividing a scheduled travel route that is in a range of a predetermined distance from a current location into a plurality of sections such that a difference in traffic congestion degree is distinguished, and dividing a scheduled travel route that is not in the range of the predetermined distance from the current location into a plurality of sections such that a difference in travel load is distinguished.

Exemplary embodiments provide a section acquisition program that causes a computer to execute: a scheduled travel route acquisition function of acquiring a scheduled travel route of a vehicle driven by at least one of an internal combustion engine or a motor; and a section acquisition function of dividing a scheduled travel route that is in a range of a predetermined distance from a current location into a plurality of sections such that a difference in traffic congestion degree is distinguished, and dividing a scheduled travel route that is not in the range of the predetermined distance from the current location into a plurality of sections such that a difference in travel load is distinguished.

That is, in the section acquisition system, method, and program, sections are defined by dividing a scheduled travel route into a plurality of sections such that a difference in traffic congestion degree is distinguished in a range near the current location, and by dividing a scheduled travel route into a plurality of sections such that a difference in travel load is distinguished in a range far from the current location. Hybrid vehicles employ various types of control including: control in which "a secondary battery is charged with regenerative energy before traffic congestion to perform EV travel (travel in which the internal combustion engine is not used) in traffic congestion" (hereinafter referred to as traffic congestion control); and control in which "HV travel (travel in which both the internal combustion engine and the motor are used) is performed under a high travel load and EV travel is performed under a low travel load so that a distance the vehicle travels before an SOC of the secondary battery reaches the lower limit is maximized" (hereinafter referred to as long distance control).

In a possible example of a hybrid vehicle that cannot be charged with a power plug, for example, since the capacitance of a secondary battery is smaller than that of a plug-in hybrid vehicle, the vehicle is not configured to perform the long distance control but is configured to perform the traffic congestion control. On the other hand, in a possible example of a plug-in hybrid vehicle, the traffic congestion control and the long distance control can be performed in accordance with an SOC of the secondary battery and travel environments, for example.

In the case of performing the traffic congestion control, a scheduled travel route is preferably divided into a plurality of sections such that a difference in traffic congestion degree is distinguished. In the case of performing the long distance control, a scheduled travel route is preferably divided into a plurality of sections such that a difference in travel load is distinguished. However, even in the case where a scheduled travel route is divided into a plurality of sections such that a difference in traffic congestion degree is distinguished, the long distance control can also be performed by focusing on a travel load of each of the sections with a focus on the section. In addition, in the case where a scheduled travel route is divided based on the difference in traffic congestion degree or travel load, the traffic congestion degree or the travel load is less likely to change at all the intersections, and thus, the total number of sections is generally small, as compared to that of sections obtained by dividing the scheduled travel route at intersections.

In view of this, by dividing a scheduled travel route into a plurality of sections, as sections in a range near the current location, such that a difference in traffic congestion degree is distinguished, any of the traffic congestion control and the long distance control can be performed in this range. Since the traffic congestion control is not performed with a focus on sections in a range far from the current location, a scheduled travel route in the range far from the current location only needs to be divided into a plurality of sections such that a difference in travel load is distinguished. Dividing the scheduled travel route in this way allows obtaining sections fewer than those obtained by dividing the scheduled travel route at intersections, and allows defining sections usable for performing control for suppressing fuel consumption in different types of hybrid vehicles.

DETAILED DESCRIPTION OF EXEMPLARY EMBODIMENTS

Embodiments will be described in the following order:
(1) Configuration of Section Acquisition System;
(2) Section Acquisition Processing
(2-1) Section Division Processing for Traffic Congestion Control
(2-2) Section Division Processing for Long Distance Control; and
(3) Other Embodiments.

(1) Configuration of Section Acquisition System

Figure 1:
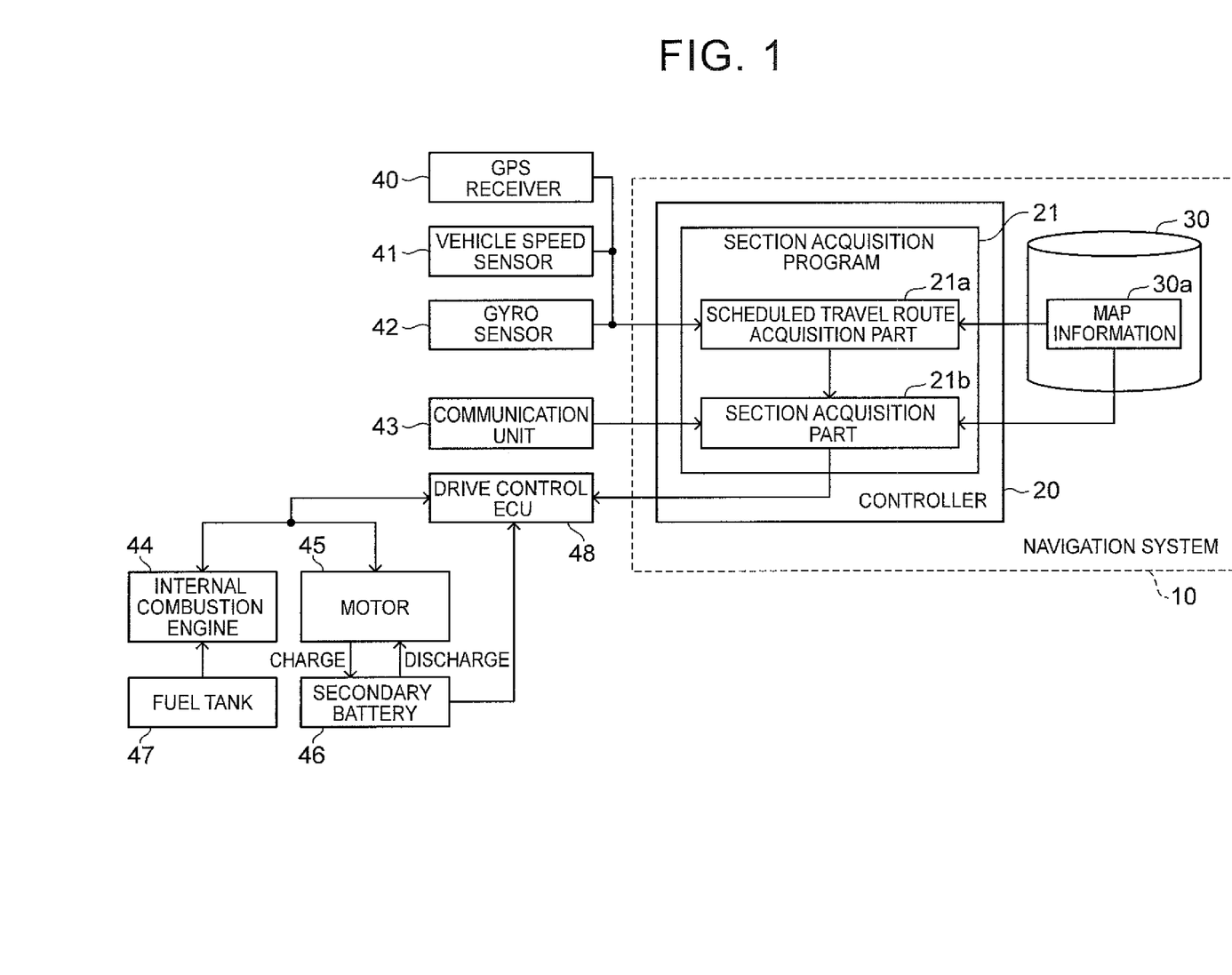
FIG. 1 is a block diagram of a section acquisition system.

FIG. 1 is a block diagram illustrating a configuration of a section acquisition system installed in a vehicle. In this embodiment, the section acquisition system is implemented by a navigation system 10. The navigation system 10 includes: a controller 20 including, for example, a CPU, a RAM, and a ROM; and a storage medium 30. (As used herein, the term "storage medium" is not intended to encompass transitory signals.) The controller 20 can execute programs stored in the storage medium 30 and the ROM. As this program, an unillustrated navigation program can be executed in this embodiment. The navigation program is used for searching for a scheduled travel route to a destination and causing the controller 20 to execute a function of guiding a vehicle to travel on the scheduled travel route.

In this embodiment, the navigation system 10 generates section information for controlling travel with suppressed fuel consumption in the vehicle, and causes the controller 20 to execute processing of transmitting the information to a drive control ECU (described later) of the vehicle. To generate the section information, a scheduled travel route is divided into a plurality of sections, and section information is generated for each of the divided sections. The navigation program includes a section acquisition program 21 for dividing a scheduled travel route into sections.

The vehicle includes the following components (40 to 48) that operate in cooperation with the navigation system 10 or perform vehicle control. A GPS receiver 40 receives radio waves from a GPS satellite, and outputs a signal indicating a signal for calculating a current location of the vehicle via an unillustrated interface. The controller 20 receives this signal and acquires a current location of the vehicle. A vehicle speed sensor 41 outputs a signal corresponding to a rotation speed of wheels of the vehicle. The controller 20 receives the signal via the unillustrated interface and acquires a vehicle speed. A gyro sensor 42 detects an angular acceleration in cornering of the vehicle on a horizontal plane, and outputs a signal corresponding to an orientation of the vehicle. The controller 20 receives this signal and acquires a traveling direction of the vehicle. The vehicle speed sensor 41 and the gyro sensor 42, for example, are used to specify a travel track of the vehicle. In this embodiment, the current location is specified based on a departure place and the travel track of the vehicle, and the current location of the vehicle specified based on the departure place and the travel track is corrected based on a signal output from the GPS receiver 40.

A communication unit 43 includes a circuit that communicates with a traffic congestion information management system external to the vehicle. The controller 20 communicates with the traffic congestion information management system via the communication unit 43 to acquire a traffic congestion degree of a road section indicated by any link. In this embodiment, the traffic congestion degree only needs to be an index for evaluating the degree of traffic congestion, and is information indicating the degree of traffic congestion on a scale. In this embodiment, the traffic congestion degree is assumed to include the state of "traffic congestion" where traffic congestion occurs and the state of "uncrowded" where no traffic congestion occurs.

The vehicle in this embodiment is a hybrid vehicle including driving sources constituted by an internal combustion engine 44 that uses as a power supply a fuel stored in a fuel tank 47 and a motor 45 that uses as a power supply electric power stored in a secondary battery 46. The vehicle according to this embodiment may be a plug-in hybrid vehicle that can be charged with a power plug or a hybrid vehicle that cannot be charged with a power plug. The internal combustion engine 44 and the motor 45 are coupled to an unillustrated power transmission mechanism. The power transmission mechanism converts a rotary driving force to a driving force of the vehicle so as to drive the vehicle. The vehicle can be driven by one or both of the internal combustion engine 44 and the motor 45. The motor 45 can rotate in a direction opposite to the rotation direction in driving the vehicle, and the secondary battery 46 is charged with regenerated electric power generated by this rotation.

The internal combustion engine 44 and the motor 45 are controlled by a drive control ECU 48. The drive control ECU 48 can output a control signal to the internal combustion engine 44 and the motor 45. In response to the control signal output to the internal combustion engine 44 and the motor 45, one or both of the internal combustion engine 44 and the motor 45 are controlled to generate a rotary driving force. Thus, in this embodiment, based on the control signal output from the drive control ECU 48, driving or stopping of the internal combustion engine 44, charging by the motor 45, and driving of the motor 45 due to discharge of the secondary battery 46 are selected. The drive control ECU 48 can acquire a state of charge (SOC) [%] from the secondary battery 46 and notify the controller 20 of the SOC.

In this embodiment, the drive control ECU 48 is configured to perform control that suppresses fuel consumption. Examples of this control include: traffic congestion control in which "the secondary battery is charged with regenerative energy before traffic congestion to perform EV travel (travel in which the internal combustion engine is not used) in traffic congestion"; and long distance control in which "HV travel (travel in which both the internal combustion engine and the motor are used) is performed under a high travel load, and EV travel is performed under a low travel load so that a distance the vehicle travels before the SOC of the secondary battery reaches the lower limit is maximized." In the case where the hybrid vehicle is a hybrid vehicle in which the secondary battery 46 cannot be charged with a power plug, the drive control ECU 48 can perform the traffic congestion control but is not configured to perform the long distance control. That is, in the hybrid vehicle in which the secondary battery 46 cannot be charged with a power plug, the secondary battery 46 has a capacitance smaller than that in a plug-in hybrid vehicle, and thus, the drive control ECU 48 is not configured to perform long distance control but is configured to perform the traffic congestion control. On the other hand, in a case where the hybrid vehicle is a plug-in hybrid vehicle in which the secondary battery 46 can be charged with a power plug, the drive control ECU 48 can perform both the traffic congestion control and the long distance control in accordance with the SOC of the secondary battery and travel environments, for example.

In addition, in this embodiment, the drive control ECU 48 is configured to perform the traffic congestion control and the long distance control described above while the vehicle is traveling on the scheduled travel route, and in the state where the scheduled travel route is divided into a plurality of sections, the drive control ECU 48 acquires parameters (section information) necessary for control in each of the sections and performs control. Thus, the controller 20 is configured to transmit the section information on each section to the drive control ECU 48. The controller 20 acquires sections through processing of the section acquisition program 21, acquires section information on each of the acquired sections, and transmits the information to the drive control ECU 48.

The amount of resources for the drive control ECU 48 is smaller than that of the resources in other devices (e.g., a server dedicated to information processing) that can execute complicated information processing, and it takes time to perform processing on section information of an excessively large number of sections. The communication band used in transmitting the section information from the controller 20 to the drive control ECU 48 by wire communication is not excessively large. Thus, in this embodiment, an upper limit of the distance (maximum distance) of the scheduled travel route to be divided into sections and an upper limit of the number of sections obtained by dividing the scheduled travel route (maximum number of sections) are previously determined. The controller 20 performs processing of dividing the scheduled travel route into sections in such a manner that the number of sections after the division is the maximum number of sections or less.

To perform such processing, the section acquisition program 21 includes a scheduled travel route acquisition part 21a and a section acquisition part 21b. Map information 30a is stored in the storage medium 30 beforehand. The map information 30a includes node data indicating, for example, the location of a node set on a road on which the vehicle is to travel, shape interpolation point data indicating, for example, the location of a shape interpolation point for specifying the shape of a road between nodes, link data indicating connection between nodes, gradient data indicating a road gradient, friction coefficient data indicating a friction coefficient of a road, and data indicating a road or features around the road. The map information 30a is used for searching for a scheduled travel route from a current location of the vehicle to a destination, providing route guidance, and acquiring a travel load, for example.

The scheduled travel route acquisition part 21a is a module that causes the controller 20 to perform a function of acquiring a scheduled travel route of a vehicle driven by at least one of an internal combustion engine or a motor. In this embodiment, information indicating a scheduled travel route that has been searched for by the controller 20 is acquired through processing of an unillustrated navigation program. Accordingly, link data indicating links constituting the scheduled travel route are specified. The link data are data indicating road sections between intersections, and thus, the scheduled travel route is specified as a sequence of road sections between intersections. In this embodiment, road sections between intersections constituting the scheduled travel route are specified before division into sections for the traffic congestion control and the long distance control is performed, and these road sections are used as initial sections.

The section acquisition part 21b is a module that causes the controller 20 to perform a function of dividing a scheduled travel route that is in a range of a predetermined distance from a current location into a plurality of sections such that a difference in traffic congestion degree is distinguished and dividing a scheduled travel route that is not in the range of the predetermined distance from the current location into a plurality of sections such that a difference in travel load is distinguished. That is, through the processing of the section acquisition part 21b, the controller 20 divides the scheduled travel route into a plurality of sections by switching between division into sections for the traffic congestion control and division into sections for the long distance control in accordance with the distance from the current location.

Since the traffic congestion control described above is control in which "the secondary battery is charged with regenerative energy before traffic congestion to perform EV travel (travel in which the internal combustion engine is not used) in traffic congestion," a scheduled travel route is preferably divided into a plurality of sections such that a difference in traffic congestion degree is distinguished. On the other hand, since the long distance control is control in which "HV travel (travel in which both the internal combustion engine and the motor are used) is performed under a high travel load, and EV travel is performed under a low travel load so that a distance the vehicle travels before the SOC of the secondary battery reaches the lower limit is maximized," a scheduled travel route is preferably divided into a plurality of sections such that a difference in travel load is distinguished.

However, even in the case where a scheduled travel route is divided into a plurality of sections such that a difference in traffic congestion degree is distinguished, the long distance control can also be performed by focusing on a travel load of each of the sections with a focus on the section. In addition, in the case where a scheduled travel route is divided based on the difference in traffic congestion degree or travel load, the traffic congestion degree or the travel load is less likely to change at all the intersections, and thus, the total number of sections is generally small, as compared to that of sections obtained by dividing the scheduled travel route at intersections.

In view of this, through the processing of the section acquisition part 21b, the controller 20 divides a scheduled travel route in a range near the current location into a plurality of sections such that a difference in traffic congestion degree is distinguished. Consequently, in this range, any of the traffic congestion control and the long distance control can be performed. Since the traffic congestion control is not performed with a focus on sections in a range far from the current location, through the processing of the section acquisition part 21b, the controller 20 divides a scheduled travel route in the range far from the current location into a plurality of sections such that a difference in travel load is distinguished. Dividing the scheduled travel route in this way allows obtaining sections fewer than those obtained by dividing the scheduled travel route at intersections, and allows defining sections usable for performing control for suppressing fuel consumption in different types of hybrid vehicles.

After the division into sections has been completed, the controller 20 acquires section information on the sections through the processing of the section acquisition part 21b, and transmits the section information to the drive control ECU 48. The section information is information indicating travel loads and traffic congestion degrees in the sections. As a result, the drive control ECU 48 performs control for suppressing fuel consumption in accordance the travel load and the traffic congestion degree in each of the sections.

(2) Section Acquisition Processing

Figure 2:
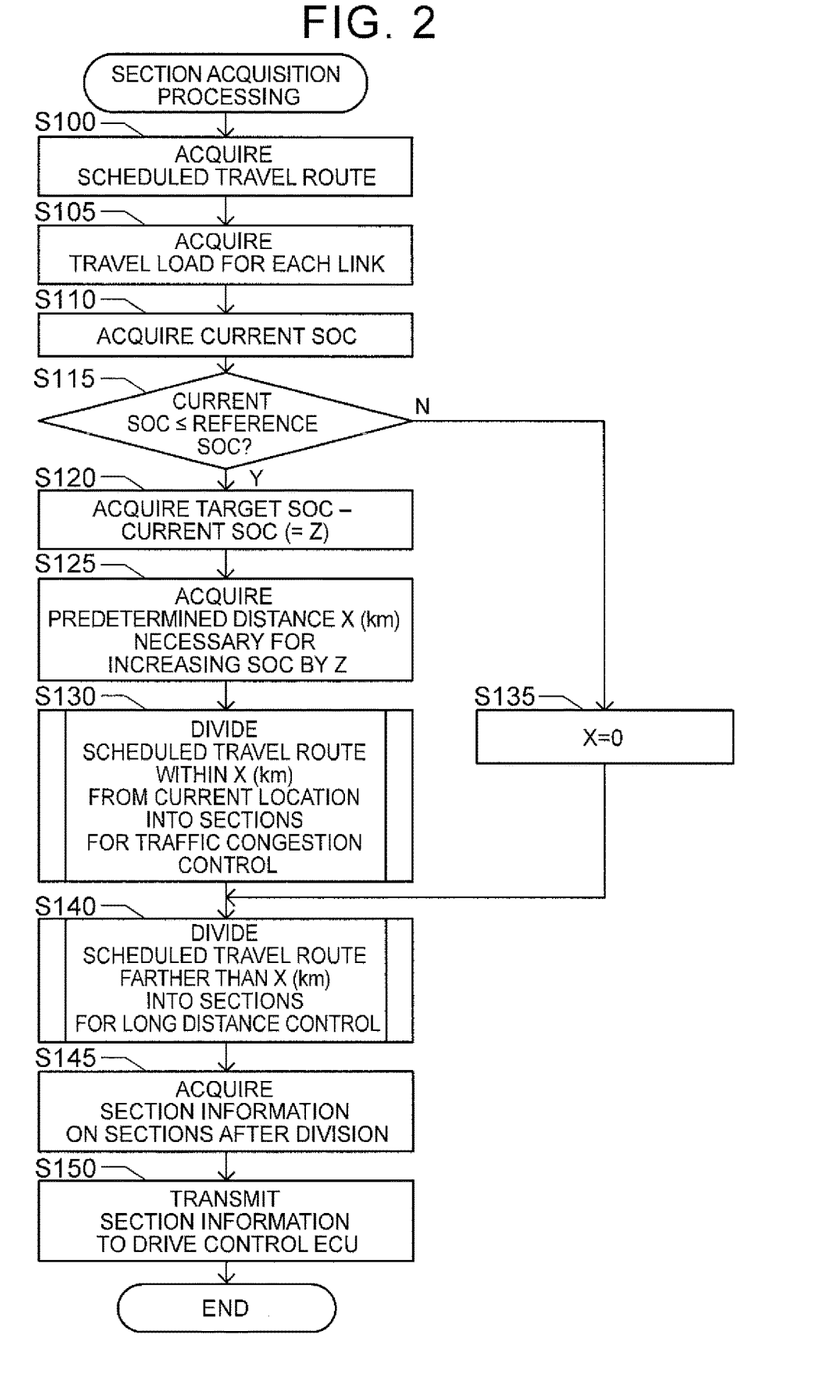
FIG. 2 is a flowchart showing section acquisition processing.

Section acquisition processing performed by the controller 20 having the configuration described above will now be described. FIG. 2 is a flowchart of the section acquisition processing. While the vehicle is traveling, the section acquisition processing is executed at every predetermined interval (e.g., 100 ms). In the section acquisition processing, the controller 20 acquires a scheduled travel route through the processing of the scheduled travel route acquisition part 21a (step S100). Specifically, the controller 20 acquires a current location of the vehicle based on output signals of the GPS receiver 40, the vehicle speed sensor 41, and the gyro sensor 42, acquires a scheduled travel route acquired through the processing of an unillustrated navigation program, and acquires a scheduled travel route forward of the current location.

Next, the controller 20 acquires a travel load for each link through the processing of the section acquisition part 21b (step S105). Specifically, since the scheduled travel route forward of the current location is specified by links (which indicate road sections), the controller 20 acquires parameters (e.g., a friction coefficient and a gradient resistance) for acquiring a travel load with reference to the map information 30a on each location of a road section indicated by a corresponding one of the links. The controller 20 also acquires parameters (e.g., a weight, an air resistance, an acceleration resistance, and a frontal projected area of the vehicle) for acquiring a travel load based on specifications of the vehicle. The parameters are then assigned to a previously specified equation for calculating a travel load, thereby a load for travel at each location is specified. The load is integrated across the entire length at each link and the resultant is divided by a link distance, thereby acquiring a travel load per unit distance.

Next, the controller 20 acquires a current SOC through the processing of the section acquisition part 21b (step S110). Specifically, the controller 20 outputs a control signal for inquiring an SOC to the drive control ECU 48. In response to the control signal, the drive control ECU 48 acquires an SOC from the secondary battery 46 and responds to the controller 20. Consequently, the controller 20 acquires the SOC of the secondary battery 46.

Thereafter, through the processing of the section acquisition part 21b, the controller 20 determines whether or not a current SOC is less than or equal to a reference SOC (step S115). Here, the reference SOC is an SOC value that is previously determined for determining whether or not the traffic congestion control is necessary. In step S115, if it is not determined that the current SOC is less than or equal to the reference SOC, 0 is assigned to a distance X so that division into sections for the traffic congestion control is skipped (step S135).

In step S115, if it is determined that the current SOC is less than or equal to the reference SOC, the controller 20 assumes that the traffic congestion control is necessary, and acquires a value by subtracting the current SOC from the target SOC through the processing of the section acquisition part 21b (step S120). The target SOC is a fixed value at which sufficiency of the SOC of the secondary battery is defined with a certain statistical reliability. Here, the value acquiring by subtracting the current SOC from the target SOC is defined as Z.

Subsequently, through the processing of the section acquisition part 21b, the controller 20 acquires a predetermined distance X (km) necessary for increasing the SOC by Z (step S125). In this embodiment, a map is defined in which the value Z is previously associated with a value of the predetermined distance X, and the controller 20 determines the distance X corresponding to the value Z with reference to the map. In this embodiment, the target SOC is a value at which sufficiency of the SOC of the secondary battery is defined with a certain statistical reliability. Thus, the predetermined distance necessary for increasing the current SOC by Z to obtain the target SOC is set at a value at which sufficiency of the SOC of the secondary battery is defined with a certain statistical reliability, in the range that is farther than the predetermined distance. When the current SOC exceeds the reference SOC during the travel, the drive control ECU 48 performs control based on sections obtained by dividing the scheduled travel route for the long distance control.

Next, through the processing of the section acquisition part 21b, the controller 20 divides a scheduled travel route that is in a range of X (km) from the current location into sections for the traffic congestion control (step S130). This step S130 will be specifically described later. In step S130, in the case of performing division into sections for the traffic congestion control or in the case of performing step S135 and skipping division into sections for the traffic congestion control, the controller 20 divides a scheduled travel route that is farther than X (km) into sections for the long distance control through the processing of the section acquisition part 21b (step S140). This step S140 will be specifically described later.

Thereafter, through the processing of the section acquisition part 21b, the controller 20 acquires section information on sections after the division (step S145). That is, for each section after the division, information indicating a travel load per unit distance and a traffic congestion degree is acquired. Through the processing of the section acquisition part 21b, the controller 20 transmits the section information to the drive control ECU 48 (step S150). Consequently, the division for the traffic congestion control is performed for the range from the current location to the predetermined distance, whereas division for the long distance control is performed for the range that is farther than the predetermined distance. Thus, the section information on the sections that is obtained by dividing the scheduled travel route so as to be equal to or fewer than the maximum number of sections is transmitted to the drive control ECU 48.

(2-1) Section Division Processing for Traffic Congestion Control

Figure 3A:
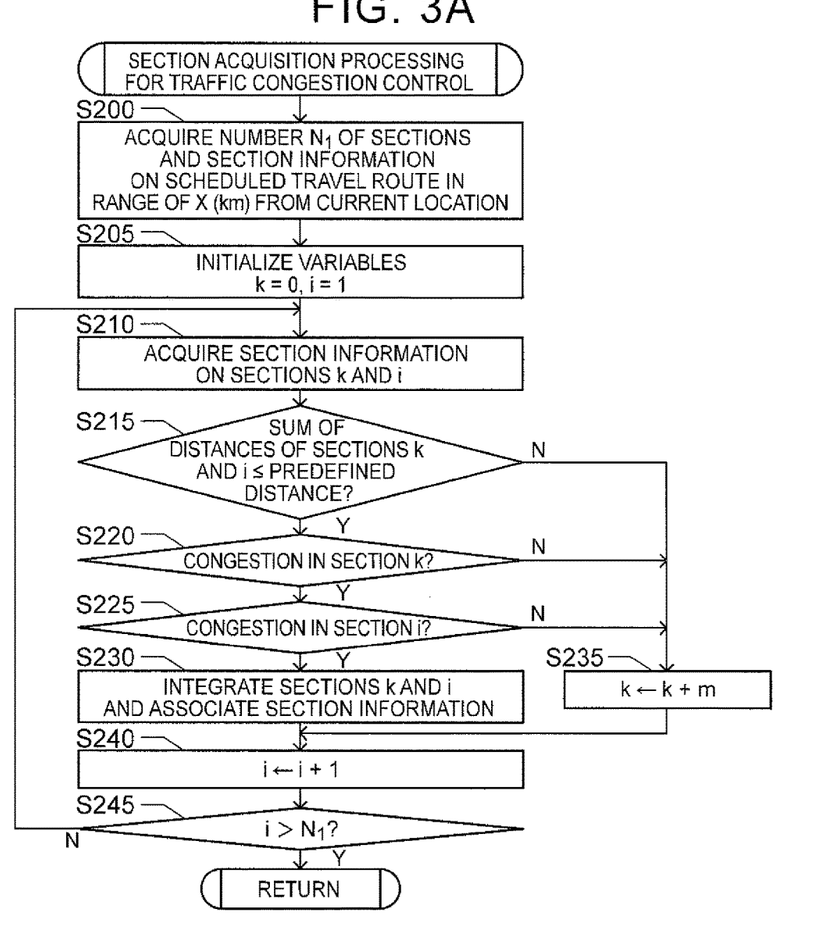
FIG. 3A is a flowchart showing section division processing for traffic congestion control.

The processing in step S130 will be specifically described. FIG. 3A is a flowchart showing section division processing for the traffic congestion control that is the processing in step S130. In the section division processing for the traffic congestion control, the controller 20 acquires the number $N_1$ of sections and section information on a scheduled travel route that is in a range of X (km) from the current location (step S200). That is, the controller 20 specifies distances of sections constituting the scheduled travel route forward of the current location with reference to the map information 30a, and sequentially sums the distances from the section closest to the current location, thereby specifying sections whose sum is X (km) or more. The number of specified sections in this case is acquired as the number $N_1$ of sections. The controller 20 acquires travel loads of the sections acquired in step S105. The controller 20 further acquires information indicating the traffic congestion degrees of sections from the traffic congestion information management system via the communication unit 43. In the case where the processing shown in FIG. 3A is executed for the first time, the sections are links serving as initial sections. In the case where the processing shown in FIG. 3A is executed for the second and subsequent times, if integration is performed in previous processing, the sections are integrated sections, and if no integration is performed, the sections are links serving as initial sections.

Next, the controller 20 initializes variables (step S205). Here, a variable k for specifying a section to be concerned as a processing target is 0, and a variable i for sequentially specifying a section adjacent to a section k in a traveling direction on the scheduled travel route is 1. Here, the number 0 is associated with a section including the current location, and the numbers 1, 2, and 3 are associated with sections close to the current location on the scheduled travel route in this order.

Thereafter, the controller 20 acquires section information on sections k and i (step S210). Specifically, the controller 20 acquires section information on the sections k and i of the section information acquired in step S200, thereby acquiring travel loads and traffic congestion degrees of the sections k and i. Subsequently, the controller 20 determines whether or not the sum of distances of the section k and the section i is less than or equal to a predefined distance (step S215). Specifically, when the distance of integrated section increases because sections are excessively integrated, resolution in analyzing fuel consumption excessively decreases. In view of this, in this embodiment, in order that the integrated section is set to be less than or equal to a predefined distance (e.g., 500 m), if the sum of the distances of the section k and the section i is not determined to be less than or equal to the predefined distance in step S215, the controller 20 assigns k+m to the variable k for specifying a section to be concerned (step S235), and the section to be concerned is changed. Here, m depends on the number of times integration of sections is performed. In a case where the section k is not integrated with another section in loop processing from steps S210 to S245, m is 1. In a case where the section k is integrated with another section, m is the number of sections+1.

On the other hand, in step S215, if it is determined that the sum of distances of the section k and the section i is less than or equal to the predefined distance, the controller 20 determines whether or not traffic congestion occurs in the section k (step S220). That is, the controller 20 determines whether or not the traffic congestion degree is congestion in the section information on the section k acquired in step S210.

In step S220, if it is not determined that traffic congestion occurs in the section k, the controller 20 executes step S235. Specifically, if it is not determined that traffic congestion occurs in the section k, the section k is not integrated with another section, and the section to be concerned is changed from the section at number k to a section at number k+m. On the other hand, in step S220, if it is determined that traffic congestion occurs in the section k, the controller 20 determines whether or not traffic congestion occurs in the section i (step S225). Specifically, the controller 20 determines whether or not the traffic congestion degree is congestion in the section information on the section i acquired in step S210. In step S225, if it is not determined that the section i shows traffic congestion, the controller 20 executes step S235. Specifically, if it is not determined that traffic congestion occurs in the section i, the section k is not integrated with the section i, and the section to be concerned is changed.

On the other hand, in step S225, if it is determined that traffic congestion occurs in the section i, the controller 20 integrates the sections k and i together, and associates the integrated sections k and i with section information (step S230). Specifically, in a case where the traffic congestion degrees of both the sections k and i are congestion and show no difference, the controller 20 integrates the sections k and i together and newly defines the integrated sections as a section. Accordingly, in this embodiment, in a case where the traffic congestion degrees differ from each other between sections, it is assumed that there is a difference in traffic congestion degree by a reference degree or more and the sections are distinguished from each other. With this configuration, not the traffic congestion degree of individual locations but that of each section is evaluated so that sections after division can be acquired, and the processing can be performed at higher speed as compared to a configuration in which a traffic congestion degree at each location is evaluated. In this embodiment, sections whose traffic congestion degrees are congestion are integrated together. Alternatively, sections whose traffic congestion degrees are uncrowded may be integrated together.

In step S230, the controller 20 associates the integrated section with section information. Specifically, the controller 20 sets the traffic congestion degree of the integrated section as congestion. The controller 20 multiplies travel loads (travel loads per unit distance) of the sections k and i before integration by weights corresponding to distances of the sections k and i to acquire a travel load of the integrated section, and associates the acquired travel load with the integrated section (number k). The weights corresponding to the distances of the sections k and i are respectively (distance of section k)/(distance of section k+distance of section i) for the section k and (distance of section i)/(distance of section k+distance of section i) for the section i.

Next, the controller 20 increments the variable i for sequentially specifying the section adjacent to the section k in the traveling direction on the scheduled travel route (step S240), and determines whether or not the variable i is larger than the number $N_1$ of sections (step S245). Specifically, if the variable i is larger than the number $N_1$ of sections, the controller 20 assumes that division of the scheduled travel route that is in the range of X (km) from the current location into sections is finished, and returns to the processing shown in FIG. 2. On the other hand, in step S245, if it is not determined that the variable i is larger than the number $N_1$ of sections, the controller 20 repeats step S210 and the subsequent processing.

Figure 3B:
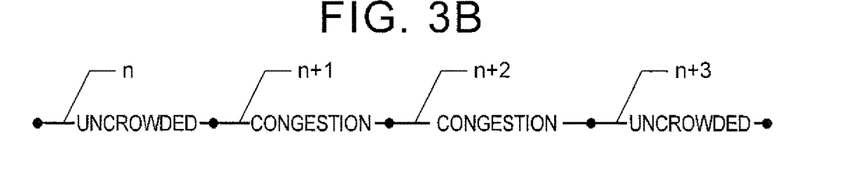
FIGS. 3B and 3C show traffic congestion degrees in individual sections.
Figure 3C:
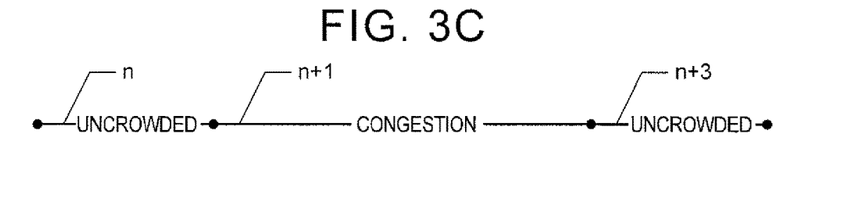

FIGS. 3B and 3C show examples of integration of sections. In the example of FIG. 3B, in sections n, n+1, n+2, and n+3 (where n is a natural number) serving as initial sections, the traffic congestion degrees are uncrowded, congestion, congestion, and uncrowded, respectively. Here, it is assumed that the section n+3 is smaller than $N_1$. In this example, in a case where the section n is the section k and step S210 and the subsequent processing are performed, it is determined in step S220 that the traffic congestion degree of the section k (section n) is uncrowded, and in step S225, it is determined that the traffic congestion degree of the section i (section n+1) is congestion. Thus, the section n is not integrated with another section, and k+m is assigned to k in step S235. Here, since no integration is performed on the section k, m is 1. Consequently, the section k to be concerned is section n+1. Thereafter, in step S240, the section i becomes section n+2, and step S210 is performed again.

In this case, it is determined in step S220 that the traffic congestion degree of the section k (section n+1) is congestion, and in step S225, it is determined that the traffic congestion degree of the section i (section n+2) is congestion. Consequently, in step S230, the sections k and i are integrated together, and the initial sections shown in FIG. 3B are integrated as shown in FIG. 3C. Thereafter, in step S240, the section i becomes section n+3, and step S210 is performed again.

In this case, in step S220, the traffic congestion degree of the section k (section n+1 after integration) is determined to be congestion, and in step S225, the traffic congestion degree of the section i (section n+3) is determined to be uncrowded. Consequently, the sections k and i are not integrated, and k+m is assigned to k in step S235. Here, the section k is integrated with another section, and thus, m is 2. Thus, in step S235, the section k becomes the section n+3. Thereafter, in step S240, the section i becomes the section n+4, and step S210 is performed.

(2-2) Section Division Processing for Long Distance Control

Figure 4A:
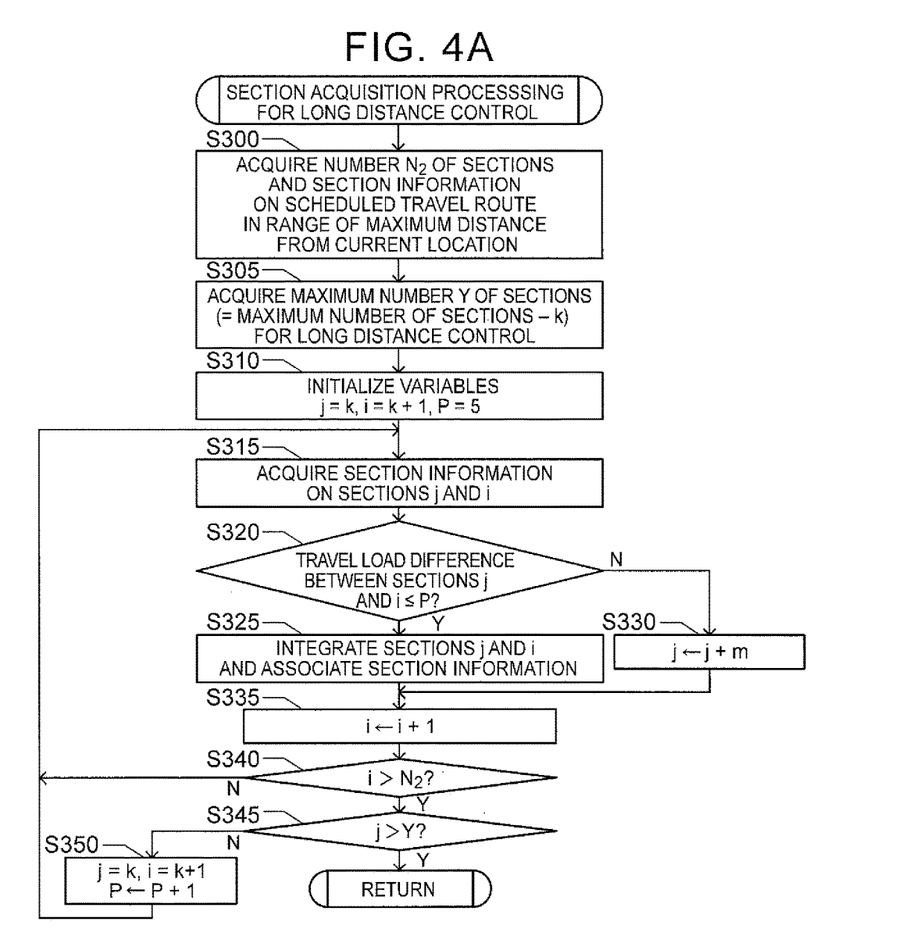
FIG. 4A is a flowchart showing section division processing for long distance control.

Now, processing in step S140 will be specifically described. FIG. 4A is a flowchart showing section division processing for the long distance control that is the processing in step S140. In the section division processing for the long distance control, the controller 20 acquires the number $N_2$ of sections and section information on a scheduled travel route that is in a range of maximum distance (km) from the current location (step S300). Specifically, the controller 20 specifies distances of sections constituting the scheduled travel route forward of the current location with reference to the map information 30a, and sequentially sums the distances from the section closest to the current location, thereby specifying sections whose sum is the maximum distance (km) or more (maximum distance >X). The maximum distance is a predetermined distance (e.g., 200 km). The number of sections in this case is acquired as the number $N_2$ of sections. In a case where the total distance of the scheduled travel route is shorter than the maximum distance, the number of sections to the end point of the scheduled travel route is acquired as the number $N_2$ of sections. The controller 20 acquires travel loads of sections acquired in step S105. In addition, the controller 20 acquires information indicating traffic congestion degrees of sections via the communication unit 43 from the traffic congestion information management system. In the case where the processing shown in FIG. 4A is executed for the first time, the sections are links serving as initial sections. In the case where the processing shown in FIG. 4A is executed for the second and subsequent times, if integration is performed in previous processing, the sections are integrated sections, and if no integration is performed, the sections are links serving as initial sections.

Thereafter, the controller 20 acquires a maximum number Y of sections for the long distance control (step S305). Specifically, the controller 20 subtracts k, which is the number of sections set as sections for the traffic congestion control, from the maximum number of sections predetermined as a maximum number of sections that can be transmitted to the drive control ECU 48, thereby acquiring the maximum number Y of sections for long distance control.

Subsequently, the controller 20 initializes variables (step S310). Here, a variable j for specifying a section to be concerned as a processing target is k (where k is 0 in the case where the section division processing for the traffic congestion control is not performed even once), a variable i for sequentially specifying a section adjacent to a section j in the traveling direction on the scheduled travel route is k+1, and a variable P indicating a value of a travel load regarded as a difference is 5 (kW).

Next, the controller 20 acquires section information on the sections j and i (step S315). Specifically, the controller 20 acquires section information on the sections j and i of the section information acquired in step S300, and thereby acquires travel loads and traffic congestion degrees of the sections j and i. The controller 20 then determines whether or not the difference in travel load between the sections j and i is less than or equal to P (step S320). Specifically, the controller 20 subtracts the travel load (a travel load per unit distance) of the section i acquired in S315 from the travel load (a travel load per unit distance) of the section j acquired in step S315, and determines whether or not the obtained result is less than or equal to P.

In step S320, if it is not determined that the difference in travel load between the sections j and i is less than or equal to P, the controller 20 assigns j+m to the variable j for specifying a section to be concerned (step S330), and changes the section to be concerned. Here, m depends on the number of times integration of the sections is performed. In a case where the section j is not integrated with another section in loop processing from steps S315 to S340, m is 1.

In a case where the section j is integrated with another section, m is the number of sections integrated+1.

On the other hand, if it is determined that the difference in travel load between the sections j and i is less than or equal to P in step S320, the controller 20 integrates the sections j and i together and associates the integrated sections with section information (step S325). Specifically, in a case where the difference in travel load between the sections j and i is less than or equal to P, the controller 20 integrates the sections j and i and newly defines the integrated sections as a section. With this configuration, sections that do not need to be distinguished from one another in the long distance control are integrated together to be defined as one section.

In step S325, the controller 20 associates the integrated section with section information. Specifically, the controller 20 multiplies travel loads (travel loads per unit distance) of the sections j and i before integration by weights corresponding to distances of the sections j and i to acquire a travel load of the integrated section, and associates the acquired travel load with the integrated section (number j). The weights corresponding to the distances of the sections j and i are respectively (distance of section j)/(distance of section j+distance of section i) for the section j and (distance of section i)/(distance of section j+distance of section i) for the section i.

Next, the controller 20 increments the variable i for sequentially specifying a section adjacent to the section j in the traveling direction on the scheduled travel route (step S335), and determines whether or not the variable i is larger than the number $N_2$ of sections (step 340). In step S340, if it is not determined that the variable i is larger than the number $N_2$ of sections, the controller 20 operates step S315 and the subsequent processing.

On the other hand, in step S340, if it is determined that the variable i is larger than the number $N_2$ of sections, the controller 20 determines whether or not the variable j for specifying a section to be concerned is larger than the maximum number Y of sections (step S345). In step S345, if it is not determined that the variable j for specifying a section to be concerned is larger than the maximum number Y of sections, the controller 20 sets the variable j for specifying a section to be concerned at k, sets the variable i for sequentially specifying a section adjacent to the section j in the traveling direction on the scheduled travel route at k+1, increments the variable P indicating a value of the travel load regarded as a difference, and repeats step S315 and the subsequent processing again.

In step S345, if it is determined that the variable j for specifying a section to be concerned is larger than the maximum number Y of sections, the controller 20 finishes the section division processing for the long distance control, and returns to the processing shown in FIG. 2. That is, in this embodiment, since the maximum number of sections that can be transmitted to the drive control ECU 48 is the maximum number Y of sections, if the number of the section j does not exceed the maximum number Y of sections in the processing from steps S315 to S340, the value of a travel load regarded as a difference is increased (conditions are relaxed), and the processing from steps S315 to S340 is performed again. When it is determined that the number of the section j exceeds the maximum number Y of sections, the controller 20 determines that the division of the scheduled travel route that is farther than X (km) from the current location into sections is finished.

Figure 4B:
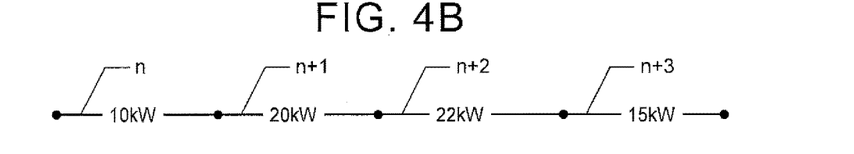
FIGS. 4B and 4C show travel loads in individual sections.
Figure 4C:
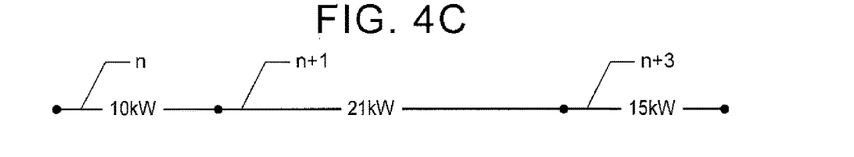

FIGS. 4B and 4C show examples of integration of sections. In the example of FIG. 4B, travel loads are 10 kW, 20 kW, 22 kW, and 15 kW in sections n, n+1, n+2, and n+3 (where n is a natural number) serving as initial sections, respectively. Here, it is assumed that the section n+3 is smaller than $N_2$. In this example, in a case where the section n is the section j and step S315 and the subsequent processing are performed in the state of P=5 kW, since the travel load in the section j (section n) is 10 kW, and the travel load of the section i (section n+1) is 20 kW, the difference is not determined to be 5 kW or less. Thus, the section n is not integrated with another section, and j+m is assigned to j in step S330. Here, the section j is not integrated with another section, and thus, m is 1. Consequently, the section j to be concerned is section n+1. Thereafter, in step S335, the section i becomes the section n+2, and step S315 is performed again.

In this case, since the travel load of the section j (section n+1) is 20 kW and the travel load of the section i (section n+2) is 22 kW, it is determined in step S320 that the difference in travel load is 5 kW or less. Consequently, in step S325, the sections j and i are integrated together, and the initial sections shown in FIG. 4B are integrated as shown in FIG. 4C. Here, since it is assumed that the distances of the sections n+1 and n+2 are the same, the travel load after the integration is 21 kW (=(½)×20+(½)×22).

Thereafter, in step S335, the section i becomes the section n+3, and step S315 is performed again. In this case, since the travel load of the section j (section n+1) is 21 kW and the travel load of the section i (section n+3) is 15 kW, it is not determined in step S320 that the difference in travel load is 5 kW or less. Consequently, the sections j and i are not integrated, and j+m is assigned to j in step S330. Here, the section j is integrated with another section, and thus, m is 2. Thus, in step S330, the section j becomes the section n+3. Subsequently, in step S335, the section i becomes the section n+4, and step S310 is performed again.

(3) Other Embodiments

The foregoing embodiment is an example, and various embodiments can be employed. For example, the navigation system 10 may be fixedly installed in a vehicle, or a portable navigation system 10 may be carried in a vehicle for use. Furthermore, a scheduled travel route may be divided into sections based on elements other than traffic congestion degrees and travel loads. For example, a scheduled travel route that is in a range of a predetermined distance from a current location may be divided into a plurality of sections such that the difference in traffic congestion degree and the degree of gradient are distinguished. That is, in a hybrid vehicle, fuel consumption may be suppressed by performing control in which "a secondary battery is discharged during travel with a motor before the vehicle reaches a downslope and the secondary battery is charged with regenerative energy in the downslope." Thus, in performing such control, a configuration may be employed in which the scheduled travel route is divided into sections such that the presence of a downslope and the degree of the downslope are distinguished.

The scheduled travel route acquisition means only needs to acquire a scheduled travel route of a vehicle driven at least one of an internal combustion engine or a motor, and specify an element for classifying sections by specifying a scheduled travel route for traveling from a current location to a destination.

The section acquisition means only needs to divide a scheduled travel route that is in a range of a predetermined distance from a current location into a plurality of sections such that a difference in traffic congestion degree is distinguished and divide a scheduled travel route that is not in the range of the predetermined distance from the current location into a plurality of sections such that a difference in travel load is distinguished. That is, the division into sections only needs to be switched between division for traffic congestion control and division for long distance control, in accordance with the distance from the current location.

The traffic congestion degree only needs to be an index for evaluating the degree of traffic congestion, and may be an index for directly or indirectly evaluating the degree of traffic congestion. As the former, an index may be employed which is set such that the traffic congestion degree increases as the number of vehicles on a road increases, whereas as the latter, an index may be employed which is set such that the traffic congestion degree increases as the vehicle speed of a vehicle on a road decreases. For sections obtained by dividing a scheduled travel route such that the difference in traffic congestion degree is distinguished, the division is performed to make the traffic congestion degrees between adjacent sections differ from each other.

Here, the difference in traffic congestion degree only needs to be previously determined as the difference in traffic congestion degree to be distinguished. Roads not having a predetermined difference in traffic congestion degree are considered to have no difference in traffic congestion degree, and are integrated together to be the same section. As processing of dividing a scheduled travel route into sections, various types of processing may be employed. Sections may be obtained by evaluating a traffic congestion degree at each location. Alternatively, a scheduled travel route may be divided by integrating initial sections that are initially provided.

For example, in a configuration that may be employed, the section acquisition means acquires initial sections obtained by dividing a scheduled travel route that is in a range of a predetermined distance from a current location in accordance with a predefined rule, and if the difference in traffic congestion degree between adjacent ones of the initial sections is less than or equal to a reference value, the adjacent initial sections are integrated together to be used as a section after the division. With this configuration, sections after division can be acquired by evaluating not traffic congestion degrees of individual locations but a traffic congestion degree of each initial section, and processing can be performed at higher speed than in a configuration in which a traffic congestion degree is evaluated at each location. As the initial sections, sections (indicated by links) obtained by dividing a scheduled travel route at intersections may be employed.

The travel load is a load per unit distance necessary for traveling on a road, and can be acquired based on, for example, the weight, friction coefficient, air resistance, acceleration resistance, gradient resistance, frontal projected area of a vehicle. Specifically, the travel load can be defined by, for example, acquiring parameters, such as the weight and resistance coefficient of the vehicle, for evaluating specifications of the vehicle and operation of the vehicle during travel, acquiring a gradient at each location, an acceleration, and the vehicle speed expected at each location, and calculating power necessary for the vehicle in driving at the acceleration and the vehicle speed at each location. In sections obtained by dividing a scheduled travel route such that the difference in travel load is distinguished, the sections are obtained by dividing a scheduled travel route in such a manner that travel loads between adjacent sections differ from each other.

Here, the difference in travel load only needs to be previously determined as a difference in travel load to be distinguished. Sections not having a predetermined difference in travel load are considered to have no difference in travel load and are integrated together to be the same section. As processing in dividing a scheduled travel route into sections, various types of processing may be employed. Sections may be obtained by evaluating a travel load at each location. Alternatively, a scheduled travel route may be divided by integrating initial sections that are initially provided.

For example, in a configuration that may be employed, the section acquisition means acquires initial sections obtained by dividing a scheduled travel route that is not in a range of a predetermined distance from a current location in accordance with a predefined rule, and if the difference in travel load between adjacent ones of the initial sections is less than or equal to a threshold value, the adjacent initial sections are integrated together to be used as a section after the division. With this configuration, sections that do not need to be distinguished from each other in the long distance control are integrated together to be the same section. As the initial sections, sections (indicated by links) obtained by dividing a scheduled travel route at intersections may be employed.

The predetermined distance serving as an index for determining whether or not target sections are close to a current location may be a variable or fixed value. As an example in which the predetermined distance is a variable value, a configuration can be employed in which the predetermined distance is set to a distance necessary for matching an SOC of a secondary battery with a target SOC. With this configuration, it can be assumed that the SOC is the target SOC at the predetermined distance, and the long distance control can be performed in a state where the target SOC is an initial SOC in a range farther than the predetermined distance. As long as the target SOC is set at a value at which sufficiency of the SOC of the secondary battery is defined with a certain statistical reliability, the long distance control can be performed without shortage of the SOC. As an example in which the predetermined distance is a fixed value, a configuration may be employed in which the predetermined distance is set to a predetermined fixed distance. For example, a configuration may be employed in which the predetermined distance is determined as a fixed value at which sufficiency of the SOC of the secondary battery is defined with a certain statistical reliability in a range farther than the predetermined distance.

In addition, in a scheduled travel route that is in a range of a predetermined distance from a current location, the section acquisition means may divide the scheduled travel route into a plurality of sections in such a manner that the number of sections per unit distance is larger than the number of sections per unit distance in a scheduled travel route that is not in the range of the predetermined distance from the current location. That is, the traffic congestion degree is a parameter for determining a travel load (e.g., for affecting the vehicle speed). Thus, in the case of dividing the scheduled travel route into sections focusing on a difference in travel load, total determination is performed in consideration of a larger number of parameters as compared to the case of dividing the scheduled travel route into sections focusing on a difference in traffic congestion degree. Thus, in general, a scheduled travel route can be more finely divided in the case of focusing on the difference in traffic congestion degree than in the case of focusing on the difference in travel load. In view of this, in a scheduled travel route that is in a range of a predetermined distance from a current location, the scheduled travel route may be divided into a plurality of sections in such a manner that the number of sections per unit distance is larger than the number of sections per unit distance in a scheduled travel route that is not in the range of the predetermined distance from the current location.

The disclosed technique of dividing a scheduled travel route that is in a range of a predetermined distance from a current location into a plurality of sections such that a difference in traffic congestion degree is distinguished, and dividing a scheduled travel route that is not in the range of the predetermined distance from the current location into a plurality of sections such that a difference in travel load is distinguished may be applicable as a method or program for performing this processing. The section acquisition system, method, and program described above may be implemented as a single system or a plurality of systems. The section acquisition system, method, and program described above may be implemented by using parts shared by components of the vehicle, or may be implemented in cooperation with a component not installed in the vehicle. Thus, various forms can be employed. Embodiments may be partially software or hardware, and as such, may be appropriately modified. In addition, embodiments may be implemented as a storage medium storing program instructions for controlling the section acquisition system. As a matter of course, the storage medium of this software may be a magnetic storage medium, an optical magnetic storage medium, or any storage medium that may be developed in the future.

The invention claimed is:

1. A section acquisition system, comprising:
a memory storing a computer-executable section acquisition program; and
a processor that is configured by the stored program to:
acquire a scheduled travel route of a vehicle at least partially driven by a motor, the scheduled travel route including a plurality of links, each link being a section of the scheduled travel route between adjacent intersections along the scheduled travel route;
set a predetermined distance as a distance over which a current state of charge (SOC) of a battery of the vehicle can be increased to a target SOC of the battery of the vehicle;
divide the scheduled travel route that is in a range of the set predetermined distance from a current location into a plurality of close-range sections, each close-range section having an assigned traffic congestion degree, the close-range sections including sections that are longer than a single link;
divide the scheduled travel route that is not in the range of the set predetermined distance from the current location into a plurality of far-range sections each far-range section having an assigned travel load, the far-range sections including sections that are longer than a single link; and
transmit the close-range sections and the far-range sections to a vehicle ECU to selectively control the motor of the vehicle traveling along the scheduled travel route.

2. The section acquisition system according to claim 1, wherein the processor is configured by the stored program to:
acquire initial sections obtained by dividing the scheduled travel route that is in the range of the set predetermined distance from the current location in accordance with a predefined rule; and
if the difference in traffic congestion degree between adjacent ones of the initial sections is less than or equal to a reference value, integrate the adjacent initial sections together to be used as a section after the division.

3. The section acquisition system according to claim 1, wherein the processor is configured by the stored program to:
acquire initial sections obtained by dividing the scheduled travel route that is not in the range of the set predetermined distance from the current location in accordance with a predefined rule; and
if the difference in travel load between adjacent ones of the initial sections is less than or equal to a threshold value, integrate the adjacent initial sections together to be used as a section after the division.

4. The section acquisition system according to claim 1, wherein:
the set predetermined distance is a predetermined fixed distance.

5. A section acquisition method, comprising:
acquiring a scheduled travel route of a vehicle at least partially driven by a motor, the scheduled travel route including a plurality of links, each link being a section of the scheduled travel route between adjacent intersections along the scheduled travel route;
setting a predetermined distance as a distance over which a current state of charge (SOC) of a battery of the vehicle can be increased to a target SOC of the battery of the vehicle;
dividing the scheduled travel route that is in a range of the set predetermined distance from a current location into a plurality of close-range sections, each close-range section having an assigned traffic congestion degree, the close-range sections including sections that are longer than a single link;
dividing the scheduled travel route that is not in the range of the set predetermined distance from the current location into a plurality of far-range sections each far-range section having an assigned travel load, the far-range sections including sections that are longer than a single link; and
transmitting the close-range sections and the far-range sections to a vehicle ECU to selectively control the motor of the vehicle traveling along the scheduled travel route.

6. A computer-readable storage medium storing a computer-executable section acquisition program, the program comprising:
instructions for acquiring a scheduled travel route of a vehicle at least partially driven by a motor, the scheduled travel route including a plurality of links, each link being a section of the scheduled travel route between adjacent intersections along the scheduled travel route;
instructions for setting a predetermined distance as a distance over which a current state of charge (SOC) of a battery of the vehicle can be increased to a target SOC of the battery of the vehicle;
instructions for dividing the scheduled travel route that is in a range of the set predetermined distance from a current location into a plurality of close-range sections, each close-range section having an assigned traffic congestion degree, the close-range sections including sections that are longer than a single link;
instructions for dividing the scheduled travel route that is not in the range of the set predetermined distance from the current location into a plurality of far-range sections each far-range section having an assigned travel load, the far-range sections including sections that are longer than a single link; and instructions for transmitting the close-range sections and the far-range sections to a vehicle ECU to selectively control the motor of the vehicle traveling along the scheduled travel route.

\* \* \* \* \*